United States Patent [19]

Hall et al.

[11] Patent Number: 4,685,683
[45] Date of Patent: Aug. 11, 1987

[54] FLEXIBLE ENVELOPE SEAL AND SEALING METHOD

[75] Inventors: Robert L. Hall, Surrey, United Kingdom; Joris R. I. Franckx, Bonheiden, Belgium; Noel M. M. Overbergh, Bertem, Belgium; Jos Doucet, Kessel-Lo, Belgium; Jan Vansant, Korbeek-Lo, Belgium

[73] Assignee: Raychem Corporation, Menlo Park, Calif.

[21] Appl. No.: 517,541

[22] Filed: Jul. 27, 1983

[30] Foreign Application Priority Data

Jul. 26, 1982 [GB] United Kingdom ................ 8221597
Dec. 21, 1982 [GB] United Kingdom ................ 8236229
Jan. 24, 1983 [GB] United Kingdom ................ 8301887

[51] Int. Cl.4 ............... F16J 15/06; H02G 15/04; B29C 6/04
[52] U.S. Cl. ................... 277/1; 174/65 SS; 174/DIG. 8; 277/9; 277/342 R; 264/230; 264/342; 285/381; 138/112
[58] Field of Search ............... 277/1, 9, 9.5; 174/65 SS, DIG.8; 264/230, 342 R, DIG. 71, DIG. 76; 285/381; 138/112

[56] References Cited

U.S. PATENT DOCUMENTS

| 2,027,962 | 3/1933 | Currie. | |
|---|---|---|---|
| 3,086,242 | 7/1960 | Cook et al. | |
| 3,455,336 | 7/1969 | Ellis | 174/DIG. 8 |
| 3,597,372 | 8/1971 | Cook | 260/4 |
| 3,691,505 | 9/1972 | Graves | 174/DIG. 8 |
| 4,070,746 | 1/1978 | Evans et al. | 29/450 |
| 4,092,193 | 5/1978 | Brooks | 285/381 X |
| 4,195,106 | 3/1980 | Brusselmans | 174/DIG. 8 |
| 4,289,721 | 9/1981 | Ishise | 264/230 X |
| 4,298,415 | 11/1981 | Nolf | 264/230 X |

FOREIGN PATENT DOCUMENTS

| 2450998 | 5/1975 | Fed. Rep. of Germany | 277/1 |
|---|---|---|---|
| 2627447 | 12/1977 | Fed. Rep. of Germany | 277/1 |
| 1098304 | 1/1968 | United Kingdom | 174/DIG. 8 |
| 1440524 | 8/1973 | United Kingdom. | |
| 1353752 | 5/1974 | United Kingdom | 174/DIG. 8 |
| 2018527 | 4/1979 | United Kingdom. | |
| 2,069,773 | 8/1981 | United Kingdom | 174/DIG. 8 |

OTHER PUBLICATIONS

IBM Technical Disclosure, vol. 23, No. 4, Sep. 1980, pp. 1615–1617.

Primary Examiner—Robert S. Ward, Jr.
Attorney, Agent, or Firm—Ira D. Blecker; T. Gene Dillahunty

[57] ABSTRACT

A seal between an object such as a cable, cable splice or branch-off, and a surface such as a recoverable sleeve by means of a flexible envelope containing a void-filling composition. The void-filling composition undergoes a change from a low viscosity on installation, which allows the flexible envelope to conform to the object, to a high viscosity after installation, which gives mechanical strength to the seal. Deformation of the flexible envelope on installation may be brought about by installation of the recoverable sleeve or other surrounding surface.

37 Claims, 17 Drawing Figures

Fig.16.
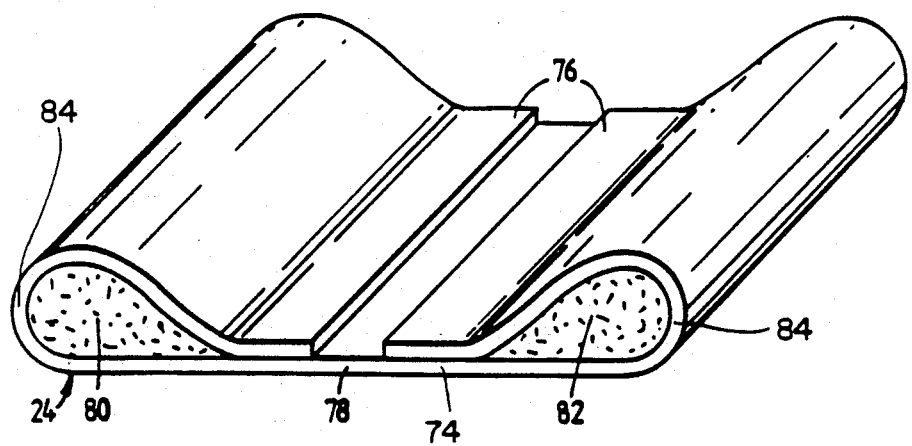
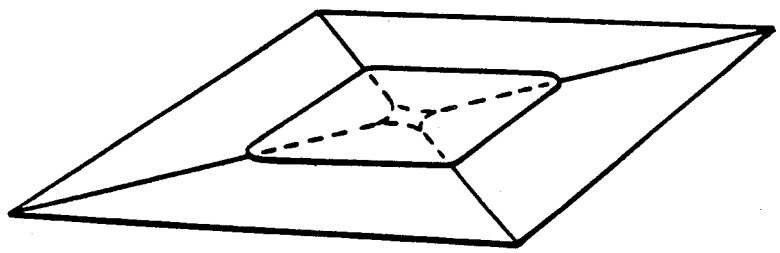
Fig.17.

FLEXIBLE ENVELOPE SEAL AND SEALING METHOD

This invention relates to sealing, and especially to sealing a space between an elongate object and a surface adjacent the elongate object.

It is often necessary to enclose part of an elongate object to protect that part of the object from the environment, for example where it is necessary to protect a joint in an electric cable or other equipment and for protection of service lines such as oil pipes. In such cases it is necessary to provide a reliable seal between an outer cover (such as a splice case) and the enclosed object (such as a cable jacket) and also between any different parts of the cover that are joined together. Another important type of seal is a duct seal, where a seal is needed between a cable, for example, and a well or bulkhead duct through which it passes.

The reason that a seal (rather than an adhesive bond of no significant thickness) is required in these instances is due to a disparity in size or shape between the outer surface and the elongate object or objects. For example, a duct may be several millimeters greater in diameter than the cable it carries, or the installed size of a cover may be larger than a cable it is desired to seal. Also, when a branch-out between two or more objects is to be sealed it will generally be necessary to convert the concave surface at the crutch region to a convex or straight surface that can be enclosed by, say, half shells or a recoverable sleeve.

Such seals have usually been formed by the use of a conformable sealing member for example an O-ring, or the use of a sealant or a hot-melt adhesive. Whilst these seals in general work in a satisfactory manner, problems sometimes occur. For example, by their nature, conformable sealing members have a low modulus and, especially where they are used to fill large voids, may have a tendency to creep over a long period of time. Also in some circumstances leak paths may occur if it has not been possible to introduce sufficient heat into a hot-melt adhesive seal to melt the adhesive. The leak paths may permit, for example, ingress of moisture, or in the case of a pressurized cable, egress of the pressurising fluid.

According to one aspect, the present invention provides a method of forming a seal between at least one elongate object and a surface adjacent the or each object, which comprises:

(a) positioning between the surface and the object a flexible envelope containing a void-filling composition which is capable of undergoing a change from a state of lower viscosity to a state of higher viscosity;

(b) deforming at least part of the envelope thereby causing the void-filling composition to conform to the object and to the surface and (c) causing said change from lower viscosity to higher viscosity.

The maximum allowable for the lower viscosity will depend on the flexibility of the material of the envelope and on the size and arrangement of the substrate adjacent which the envelope has to be positioned. We prefer, however, that the initial viscosity is less than $10^7$ cp, more preferably less than $10^6$ cp, most preferably less than $10^5$ cp, especially less than $5 \times 10^3$ cp. These values should be taken at the installation temperature or below. For example, where the surface comprises a heat recoverable material, the relevant temperature will be the recovery temperature of the material. We prefer, however, that these maxima for the lower viscosity apply also at ambient temperature, especially where the envelope contains reactive components that must be mixed before use.

The minimum allowable value for the higher viscosity will depend on the extent to which the envelope is located by the substrate and the surface and on the conditions that the seal will be subjected to, for example pressure within a pressurized cable splice. Typical minimum values, however, can be regarded as $10^7$ cp, preferably $10^{10}$ cp, more preferably $10^{12}$ cp most preferably $10^{14}$ cp, especially $10^{15}$ cp or higher which includes materials which are rigid. The appropriate temperature here is the temperature the seal will experience in use.

It is preferred that the composition after the change to a higher viscosity has a shore A hardness (according to ASTM D2240) of at least 20, preferably at least 30, more preferable at least 50, especially at least 90.

The envelope may be used in conjunction with a sealant mass to fill small spaces, if any, between the envelope and the object and/or the surface. Such a sealant mass is preferably supplied attached to an external surface of the envelope, and is preferably a mastic as described below as one possible void-filling composition.

The surface may be in any form suitable for enclosing the object, or may be a duct through which the object passes. In the first of these cases it is preferably in a form that is capable of deforming the envelope to cause the envelope to conform to the object and to the surface. Thus, for example, the surface may be a mechanically operated rigid cover, e.g. in the form of a pair of rigid plastics or metal half-shells that are positioned over the object and the seal and are secured together e.g. by bolting. Preferably, however, the surface is a cover which is dimensionally recoverable. In the second case mentioned above, where the surface is a duct, a further member may be provided to cause the deformation. Such further member may be mechanically operated, for example a hose clamp or half-shells, or may be dimensionally recoverable. Alternatively, in each of these cases the envelope may be deformed by hand or by means of a re-usable tool.

Dimensionally recoverable articles are articles having a dimensional configuration that may be made substantially to change when subjected to an appropriate treatment such as the application of an appropriate solvent as described in U.S. Pat. No. 4,070,746 and UK Patent Specification No. 2018527A, the disclosures of which are incorporated herein by reference. Of particular note, however, are dimensionally heat-recoverable articles, that is, articles having a dimensional configuration that may be made substantially to change by heat treatment.

Usually these articles recover, on heating, towards an original shape from which they have previously been deformed but the term "heat-recoverable", as used herein, also includes an article which, on heating, adopts a new configuration, even if it has not been previously deformed.

In their most common form, such articles comprise a heat-shrinkable sleeve made from a polymeric material exhibiting the property of elastic or plastic memory as described, for example, in U.S. Pat. No. 2,027,962; 3,086,242 and 3,597,372. As is made clear in, for example, U.S. Pat. No. 2,207,962, the original dimensionally heat-stable form may be a transient form in a continuous process in which, for example, an extruded tube is expanded, whilst hot, to a dimensionally heat-unstable form but, in other applications, a preformed dimensionally heat stable article is deformed to a dimensionally heat unstable form in a separate stage.

In the production of heat recoverable articles, the polymeric material may be cross-linked at any stage in the production of the article that will enhance the desired dimensional recoverability. One manner of producing a heat-recoverable article comprises shaping the polymeric material into the desired heat-stable form, subsequently cross-linking the polymeric material, heating the article to a temperature above the crystalline melting point or, for amorphous materials the softening point, as the case may be, of the polymer, deforming the article and cooling the article whilst in the deformed state so that the deformed state of the article is retained. In use, since the deformed state of the article is heat-unstable, application of heat will cause the article to assume its original heat-stable shape.

In other articles, as described, for example, in British Pat. No. 1,440,524, an elastomeric member such as an outer tubular member is held in a stretched state by a second member, such as an inner tubular member, which, upon heating weakens and thus allows the elastomeric member to recover.

The change in viscosity of the void-filling composition is necessary to achieve both proper installation and satisfactory performance. It is necessary that the envelope be made easily able to conform to the object and the surface under, say, the contracting force of a recoverable sleeve or a pair of rigid half-shells, and as a result the filling composition must be able to flow or be deformed. The envelope and its contents must be able to withstand the conditions required for installation; where a heat-recoverable sleeve is used a certain degree of heat resistance must be provided, and this imposes restrictions on the design of the envelope and the technique by which it is sealed after introduction of the composition. In addition to this the material of the envelope must be flexible. It is preferably a rubber, such as natural rubber or an EPDM/EVA rubber and is preferably from 0.1–0.5 mm, more preferably 0.2–0.4 mm, in thickness. It is also preferable that the material can stretch, preferably elastically, to improve its ability to conform to the surfaces. The amount of elongation available in the material that can be realized by normal installation techniques and without damage is preferably 0–50% (based on the unstretched dimensions), more preferably 10–45%, especially 30–40%. The product of the modulus and relaxed thickness of the material of the envelope is preferably from 0.3–0.75, more preferably 0.5–0.6 kg/cm. Once installed, the envelope as a whole must be able to resist any forces, such as air pressure within a splice case, which would tend to displace it, and for this reason the material should become relatively rigid after installation. Small voids or microcracks may remain between the envelope and the object or surface, but for most purposes excellent environmental sealing is achieved; however, where a high degree of pressure retention is required we have found it desirable to seal such voids or to guard against their formation by providing the sealing mass mentioned above. Such sealing mass will not be subject to undesirable creep since the voids which it is likely to have to seal are extremely small, and excellent pressure-temperature cycling results can be achieved in this way.

Some of the preferred techniques by which one can achieve the change in state of the void filling composition will now be discussed.

It is preferred that the composition has low viscosity at ambient temperature and in the form in which it is supplied. However, it is possible that some treatment be required to achieve this state. Even so, it is still preferred that the envelope can be roughly installed (for example by wrapping it around a cable) without prior treatment. Once the envelope has been roughly installed it may be treated, for example by heating, to lower the viscosity of the void-filling composition and ensure proper conformation of the envelope around the cable.

A preferred composition is a two or more component curing system, preferably a liquid curing system. The components may be supplied in separate compartments within the envelope, a dividing wall being rupturable to allow the components to be mixed. The components can be mixed by working on the envelope by hand, the envelope installed and the system allowed to cure solid. Since the curing system is a liquid from the start it will conform properly to the object and to the surrounding surface at once. An exothermic reaction may provide heat useful for softening the envelope or any external layers of mastic or other sealant.

Design of the envelope for this type of system is considered more fully below.

Multi-component curing systems can also be used where the various components are not separated by bulk as mentioned above, but instead are prevented from reacting together by being in the solid phase. On heating they melt and react together.

Alternatively, curing can be brought about for example by moisture, light or UV radiation. A curable system would be provided in an envelope which is permeable to moisture, light or UV radiation as the case may be, and this envelope stored in a further envelope which is impermeable to the respective one of these agencies. On removal of the permeable envelope from the outer envelope, curing will be initiated.

An alternative void filling compostion is a thermosetting adhesive. It is preferably initially a liquid which on heating irreversibly cures.

A thermoplastic material having a flow temperature below the desired installation temperature may also be used but the requirement that it be rigid once fully installed will generally mean that it will be solid as supplied for use, since the same ambient temperature will pertain in both cases. Nonetheless, the required change, from lower viscosity to higher viscosity, is provided by the thermoplastic material as it cools down after the initial heating. Installation can be made easier if the material is initially present as a powder or as granules, since this allows the envelope to be wrapped around the cable in approximately the correct configuration. An example of such a material is a hot-melt adhesive, such as a polyamide or EVA.

A disadvantage of this use of a ground or powdered composition (unless steps are taken to remove say air, by vacuum for example) is that the envelope will contain air (or other fluid which does not constitute part of the adhesive proper), and this may lead to leak paths if the envelope is porous or if the envelope is able to move out of contact with the object or the surrounding surface. It is for this reason that the void filling composition is preferably liquid or a softenable solid and is preferably the only material present in the envelope.

The composition may be a mastic which has a sufficiently low viscosity during installation, but is rigid enough at ambient temperatures. The change in viscosity that can be achieved is generally, however, smaller than for other material mentioned and mastics are therefore less preferred for products that must pass severe cycling tests. This general type of material includes polyisobutylene and butyl mastic according to Raychem designations S1052, S1130, and S1061 respectively. In general, such materials are formed from an adhesive material having a cohesive strength of the same order as its adhesive strength, which is used for filling voids and interstices to provide a seal against moisture, dust, solvents and other fluids. Such material is preferably a viscid, water resistant macromolecular composition resembling a newtonian fluid in exhibiting both viscous and elastic response to stress. It exhibits, in the sense of ASTM 1146, at least second order cohesive blocking (and preferably second order adhesive blocking to metals as well) at a temperature between room temperature and the crystalline melt or glass transition temperature or range of the composition. The composition may comprise mixtures of elastomers, or mixtures of thermoplastic polymers, or both, and includes mastics, and hot melt sealants as described in Bullman, Adhesives Age, November 1976, pages 25–28.

The requirement of flexibility of the material of the envelope, and the preferred feature of elasticity, were mentioned above, but there is another consideration to be borne in mind when designing a seal for a particular application. If the seal is to be wrapped around a cable or other substrate it should be less than completely full. By this we mean that the total volume of all non-compressible contents could be increased merely by allowing the envelope to take up its most voluminous shape, allowing for any non-damaging stretching of the envelope. Since the envelope preferably contains no air we are not referring to the replacement of air by more void-filling composition. A preferred embodiment provides a simple example: an envelope formed from two strips of material bonded together around their perimeters and partially full of a void-filing composition will have the shape of a flattened cylinder, the volume of which can be increased by its cross-section becoming more circular. This partial filling allows the seal to be installed by wrapping it around an object, but it also allows the seal to be deformed to match the shape of the object and the surrounding surface. If the material of the envelope can stretch, the envelope may initially have the geometry of greatest volume (for a cylinder, one of circular cross-section) since it can expand on installation. This second consideration can be used to calculate the optimum extent of filling by considering the surface area of the object and surrounding surface to be covered, and comparing it with the void between the two that must be filled. In general, however, any one seal will be suitable for a variety of applications even where this area to volume ratio differs slightly. This can be ensured by increasing the flexibility or stretchability of the material of the envelope. We have found that the ratio between the volume of the envelope were it to adopt a substantially circular cross-section, and the volume of its contents is preferably from 2–9, more preferably from 3.5–7, most preferable from 4–6, for example about 5.

The conformation of the envelope may be reckoned in terms of the ratio between the volume of composition and the surface area of the envelope. Expressed in cm the ratio is preferably 0.05–1.2, more preferably 0.07–0.95, most preferable 0.1–0.8, for example about 0.5. the value will depend on the configuration of the substrates and surface to be sealed. Where a branch out between two cables of 10 mm diameter is to be sealed, we have found that the above ratio is preferably 0.05–0.2, more preferably 0.08–0.15. The ratio for a branch out between two 50 mm cables is preferably 0.3–1.2, more preferable 0.4–0.95. Preferred ratios for other sizes can be deduced by extrapolation of these figures.

The following description is primarily concerned with an embodiment of the invention where an object is enclosed by a cover which is tightened down over the object, thereby deforming the envelope; however, what is said is generally also relevant to the use of a sealing envelope as a duct seal.

The cover may be established in its final position by fixing different parts of it together about the object, for example in the case of rigid covers in the form of half-shells. Where the cover is dimensionally recoverable it is slid over or wrapped around the object and then established in its final position by recovery thereof about the or each object and the envelope. Such a recoverable cover, when wrap-around, may be a wrap-around sleeve or a tape.

The method according to the invention may be used to provide a seal between any of the surfaces in the arrangement, for example between the object and the cover in the region of an outlet of the cover through which the object passes or between the object and opposing parts of a wrap-around cover that are brought together as the cover is installed around the object. The method is particularly suitable for sealing so-called "branch-offs" where, for example, a cable is divided into a number of smaller cables. The sealant mass, if used, may conveniently be secured to the envelope before positioning of the envelope such that the sealant mass and envelope are positioned together. The sealant mass may, however, be positioned separately, before or after the envelope.

Part of the sealant mass may, if desired, be positioned between the cover and the envelope to prevent the passage of, say, a fluid, for example a cable pressurising gas or ambient moisture, between the cover and the envelope, or it may be positioned between the envelope and the object or in both positions. Usually, however, the sealant mass will be positioned on one side of the envelope so that initially the envelope will contact both the cover and the object or objects. Where the envelope is located between the object and cover in the region of an outlet of the cover, the sealant mass is located on the side of the envelope that is directed toward the centre of the cover if the seal is used with objects such as pressurised cables so that a pressuring fluid will force the sealant mass into any spaces between the envelope and the cover or objects. If the object does not have an internal pressure, it may be preferable for the sealant to be located on the side of the envelope facing the exterior of the cover. It is, of course possible for the sealant to be located on both sides of the envelope.

Since the envelope containing void-filling components is flexible and can conform to the object and the surrounding surface, it will be particularly useful for enclosing an elongate substrate of non-uniform cross-section within a dimensionally recoverable sleeve of uniform cross-section since the flexible envelope and its contents will tend to deform so as to prevent any sharp changes in dimension of the recovered cover. Thus where the elongate object exhibits a sharp change in dimension, as for example in a cable splice at the transition between the splice region and conductors on either side of the splice, the flexible envelope and its contents will tend to smooth the outline of the recovered sleeve.

The method of the present invention can also be used to seal a branch-off between two or more elongate objects, and for this purpose the envelope is preferably arranged to extend between the elongate objects. For this purpose, it is also advantageous that the envelope and its contents are flexible so that they can conform to fill the space between the branched objects. At the branch-off, a single envelope may be positioned around and between the elongate objects, or a plurality of envelopes may be used, each envelope being wrapped around a respective one of the branched objects. Where there is a considerable difference in size between the several objects, it may be preferable to wrap the envelope around only the smaller objects since the awkward concave shape between the objects can easily be filled in this way.

The dimensionally recoverable cover may, for example, be heat-recoverable or may be recoverable by other appropriate treatment that does not require heat, for instance solvent treatment. Since the seal of the present invention need not require heat for installation, a totally heat-free system can therefore be provided. This is of particular value with cables having poor heat resistance. Nonetheless, cable damage is more likely to result from the post heating required to ensure proper melting of adhesive, especially in the crutch region of complex branch-offs, than from the heat required for complete heat recovery of the outer heat-recoverable sleeve. We have found that, even with long post heating times, the presence of the seal of this invention can eliminate or substantially reduce cable damage whilst allowing excellent sealing to be achieved. The invention may usefully be used, therefore, with heat recoverable sleeves or tapes. Such sleeves, may be heated by hot-air, torches, or by internal electric heating means, which may be self-regulating.

Where the dimensionally recoverable cover is a wrap-around sleeve as mentioned above, the envelope and its contents may be arranged to extend longitudinally beneath or between the opposed edges of the wraparound to seal between the edges. The sealant mass is preferably positioned to prevent fluid passage between the longitudinal edges of the wraparound and the envelope. For example, the sealant mass may be provided in the form of two strips extending along the envelope substantially parallel to the longitudinally opposed wrapround edges on respective sides of the opposed edges.

The invention has the advantage that it enables an effective seal between the surfaces, e.g. between a dimensionally recoverable sleeve or branch-off and the underlying substrate to be formed in a manner that does not require the input of heat from an external heat source. Thus the invention may be used with dimensionally recoverable articles other than heat recoverable articles, e.g. solvent recoverable articles. Also, since it is not necessary to apply heat e.g. from a gas torch, in order to melt any hot-melt adhesive in the seal, as is the case with known arrangements, the risk of damage to heat sensitive substrates e.g. p.v.c. or polyethylene jacketed cables may be further reduced and may, in some cases, be entirely eliminated.

According to a second aspect, the present invention provides a seal for preventing passage of fluid between at least one elongate object and a surface surrounding the or each object, which comprises:

a closed envelope of a highly flexible material; and a void-filling composition within the envelope which is capable whilst in the envelope of undergoing a change from a state of lower viscosity to a state of higher viscosity and of then remaining in said state of higher viscosity;

said envelope being flexible over substantially its entire surface thus allowing the surface to conform to that of the object or objects by bulk flow of said composition and then to retain that conformation on the change of state of the composition;

the ratio between the volume of the envelope if it were to adopt a substantially circular cross-section and the volume of its contents being from 2–9, preferably from 2.5–8, more preferably from 3.5–7, most preferably from 4–6, for example about 5.

The seal may conveniently be used in the method according to the first aspect of the present invention. Where the void-filling composition comprises two components, portions of the envelope may be secured together to separate the components contained therein. This securement may be effected by fusion bonding. By the expression fusion bonding as used herein is meant a process wherein the material in the parts to be bonded together is caused to flow to form the bond: welding by heat, solvent or ultrasonic or radio frequency energy may be used, preferably with the application of pressure, either to form a bridge from the materials of the respective lengths of polymeric material or to fuse the parts with further material. A force must be provided, in use, to overcome the fusion bond to allow the components to mix. This force may be provided by the installer of the envelope, by hand, or the envelope may be made from a dimensionally recoverably material and the force be provided by the recovery forces. The void filing components may instead be separated by a mechanical arrangement, for example a channel may be slidably and detachably engaged over a rod, squeezing portions of the envelope between the channel and the rod. The envelope may be manufactured with two or more sides open through which the composition is introduced, such sides being later closed by any of the techniques mentioned above.

As will be appreciated, the relative proportions of the two components need not be equal although, as currently envisaged, this will usually be the case. Also, whilst usually the envelope will contain only two components it is quite possible for it to contain three or more reactive components.

The envelope preferably comprises overlapping sheet portions containing therebetween the void-filling components. The overlapping sheet portions may be provided by a single sheet, opposed edges of which are folded towards each other and secured, for example by fusion bonding, to the intermediate sheet portion connecting the opposed edges. The opposed edges may, although this is not essential, meet each other.

The overlapping sheet portion may, instead, be provided by a generally tubular, polymeric envelope that has been forced into a generally flat configuration to provide the overlapping sheet portions.

In some cases it may be necessary to enclose an object with a cover, e.g. a dimensionally recoverable cover, where the cover is too large for the object. Such a case may occur for example where the object, e.g. a cable, has a diameter that is smaller than the minimum recovered diameter of the end of the cover. In this case the diameter of the object may be increased or built up by the envelope so that it will fit the cover.

Any of a number of combinations of void filling components may be used, for example a combination of a polyester with a peroxide catalyst, an epoxy with an amine or anhydride catalyst, a polyurethane with a suitable catalyst e.g. toluene diisocyanate or a two part room temperature curing silicone. Other suitable combinations will be apparent to those skilled in the art.

The following examples illustrate certain benefits to be obtained by the flexible seal of the invention.

EXAMPLE 1

Various one component void filling compositions were used to seal the crutch region of a cable branch-off, with and without an outer flexible envelope. This provides a comparison between the flexible seal of the invention and a control employing the filling-composition alone.

The seals were used at the ends of a telecommunications cable splice case enclosing a branch-off between a 40 mm cable, and one 40 mm and two 31 mm cables. The flexible seal and the filling-compositions (where possible) were wrapped around the branch-off cables at a position where they are to emerge from the splice case. A liner and recoverable sleeve coated with a heat activatable adhesive were then installed. Each splice case was tested for tightness (simply the ability to retain some pressure once) and then was subjected to temperature cycling between −30° and +60° C. at the pressures given in table 1. The table records four tests for the flexible seal of the invention and for the control. The results of the control are shown in brackets. P means pass, F means fail and dash means the installation could not be carried out.

| Test 1 | Tightness on installation |
| Test 2 | 6 cycles at 10 kPa |
| Test 3 | 20 cycles at 20 kPa |
| Test 4 | Measure number of cycles until failure at 40 kPa. |

TABLE 1

| Filling Composition | Test 1 | 2 | 3 | 4 |
|---|---|---|---|---|
| Polyisobutylene Mastic (S1052)[1] | P (P) | P (P) | P (F) | F (F) |
| Butyl Mastic (S1061)[1] | P (P) | P (P) | P (F) | F (F) |
| Polyisobutylene Mastic and Corrosion Inhibition (S1130)[1] | P (P) | P (F) | P (F) | 2 (F) |
| Versamid 200[2] (Liquid) | P (—) | P (—) | P (—) | 2 (—) |
| Vistanex LMMH[3] (Liquid) | P (—) | P (—) | P (—) | >12 (—) |
| AC5120[4] (Powder) | P (—) | P (—) | P (—) | 2 (—) |

Notes:
[1]Trade names of Raychem.
[2]Trade name for a polyamide (Schering)
[3]Trade name for a polyisobutylene (Exxon)
[4]Trade name for an ethylene/acrylic acid copolymer (Allied Chemical Corporation)

The use of a flexible envelope can be seen to provide a significant improvement in cycling performance for those materials which can be installed above, and to allow successful installation of liquid and powders (whose ability to flow at ambient temperature is useful for complex branch-offs and makes heat unnecessary) which could not otherwise be used.

EXAMPLE 2

This example also related to a cable splice formed using a heat-recoverable sleeve internally coated with a heat-activatable adhesive. In order to ensure proper sealing of the crutch region of a cable branch-off a certain amount of heat must be supplied after full recovery of the recoverable sleeve, in order to activate the adhesive coating. Where the branch-off is complex the amount of this post-heating may be large and, unless considerable care is taken, cable damage can result.

Two experiments were carried out, in each case with 40 seconds post-heating using a propane torch.

In the first case a 1 in 3 out (15 mm and 16, 11, 8 mm) configuration splice was made using British Telecom cables. The branch-off was made using a branch-off clip and repeated three times using the flexible seal of the invention and various adhesive coatings on the recoverable sleeve. For each adhesive the experiment was repeated wrapping the flexible seal around cables in a different fashion, although this was found not to affect the results of the present experiment.

| Branch-off Technique | Sleeve Adhesive | Post-heating (Seconds) | Cable Damage |
|---|---|---|---|
| Clip | CXA 2022[1] | 40 | Some |
| Flexible Seal | S1112[2] | 40 | None |
| | S1188[3] | 40 | None |
| | CXA 2022[1] | 40 | None |

Notes:
[1]An elvax (Trade name) resin of flow temperature 110° C. (DuPont)
[2]Raychem Trade name for a polyamide hot-melt adhesive.
[3]Raychem Trade name for a polyamide hot-melt adhesive for high cycling performance.

The second test for cable damage used French air-core cables in a 1 in 4 out configuration (12.5 mm and 21, 10, 8, 8 mm). The use of the flexible seal was compared with the use of clips. Due to the complex nature of a 4 out branch-off, two three legged clips were used, the central leg of one being T-shaped to ensure proper activation of adhesive between the three smaller cables.

Again several ways of wrapping the flexible seal around the cables were tested, and in each case the result was the same.

| Branch-off Technique | Adhesive | Post heating (Seconds) | Cable Damage |
|---|---|---|---|
| Clips | CXA 2022 | 40 | Some |
| Flexible Seal | CXA 2022 | 40 | None |
| Clips | S1188 | 40 | Some |
| Flexible Seal | S1188 | 40 | None |
| Clips | S1112 | 40 | Some |
| Flexible Seal | S1112 | 40 | None |

This experiment shows that the flexible seal allows adhesives and branch-off configurations which require long post-heating times to be used without cable damage on cables which are known to be susceptible to damage by heat.

A number of seals and methods of forming seals according to the present invention will now be described, by way of example, with reference to the accompanying drawings in which:

FIGS. 12 to 17 are perspective views of various seals according to the present invention.

Figure 1:
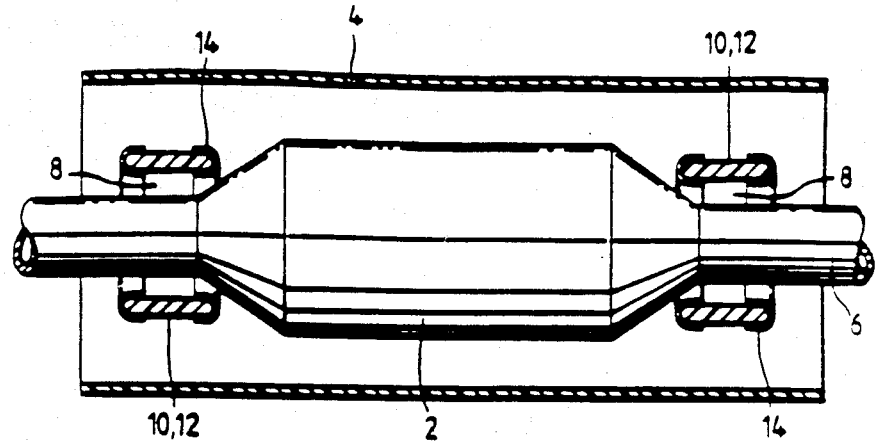
FIGS. 1 and 2 are longitudinal sections showing sealing of a spliced cable within an outer dimensionally recoverable sleeve according to the present invention.
Figure 2:
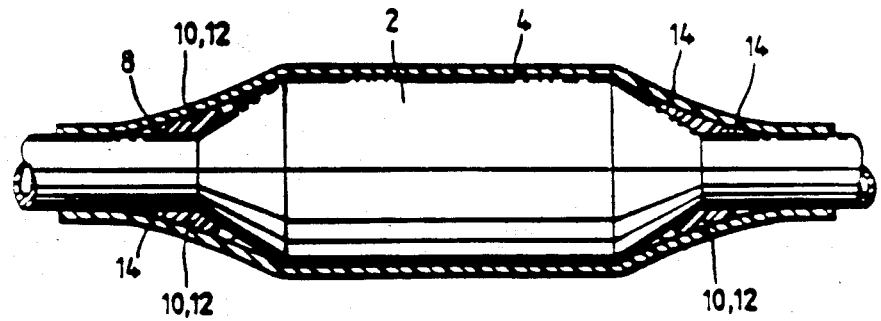

Referring to the drawings, FIGS. 1 and 2 show a method of forming a seal between a cable splice 2 and a solvent or heat shrinkable sleeve 4 that is positioned around the cables 2 to provide environmental protection. FIGS. 1 and 2 show the arrangement before and after shrinkage of the sleeve 4 respectively. A seal is required particularly at the ends 6 of the sleeve 4 to prevent, for example, moisture ingress between the sleeve 4 and the cables.

To provide the sealing, an envelope 8 containing void-filling components 10 and 12 is wrapped around respective ends of the splice 2. The envelope 8 and its contents are flexible so that they can be wrapped about the cables to conform to the contours of the underlying cables, which also means that when the sleeve 4 is shrunk over them, they conform under the shrinkage forces to fill the void between the cables and the sleeve 4 and thereby smooth out the transition between the bulky splice region and the cables on either side of the splice region (FIG. 2). It will be appreciated that this conformability enables the same size of envelope to be used to seal and fill voids of different shape and size so that it is not necessary to stock and carry large numbers of envelopes of different size.

The envelope 8 may be maintained in the correct position, for example, by applying an adhesive tape (not shown) around part of the envelope after it has been installed, or by providing a pressure sensitive adhesive layer (not shown) around part of the envelope on the surface that forms the inner surface after wrapping of the envelope.

The components 10 and 12 contained in each envelope react together exothermically on mixing to form a tough rubbery or rigid mass. During storage of the envelope 8 the components 10 and 12 must be separate to prevent premature curing and are allowed to mix only immediately before installation of the envelope. Examples of envelopes that may be used are described below with reference to FIGS. 12 to 17. Once the components 10 and 12 have cured, the envelopes 8 and their contents cannot readily be deformed, for example by the shrinkage of the sleeve. Thus it is necessary for the cure time to be sufficiently long to enable a workman to install the envelopes and shrink the sleeve before the components have completely cured. Where the envelope contains a single component, such as a mastic, the provision of separate compartments need not of course be made, but it will in general be necessary to ensure that the installation temperature is greater than the softening or flow temperature of that single component.

The envelopes 8 and their contents conform to fill any voids between the sleeve 4 and splice 2 and thus minimise leak paths, but leakage may still occur around the outer surface of the envelopes 8. To prevent such leakage a sealant mass 14, that may be located on each envelope or may be provided separately from each envelope, is positioned on the outer surface of the envelopes 8. The optimum quantity and position of the sealant mass 14 depends on a number of factors, for example the viscosity of the sealant and the intended working gauge pressure of the cable if a pressurized cable is used. The sealant mass 14 is provided on the surface of the envelopes 8 and is thus installed with the envelopes. In this case the sealant mass 14 preferably extends continuously the entire length of the envelope although the sealant could if desired be located in the form of a number of discrete masses along the envelope. An advantage of the use of the present seal is that no permanent bond need be made (and generally will not be made) between the outer sleeve and the cables. This facilitates re-entry into the enclosure for repair of maintenance, etc.

In any of the embodiments of the invention, installation may be varied, in order to form a more rugged product, by first installing an auxiliary member around the envelope 8, and then installing the outer sleeve 4. This auxiliary member may be a rubber or other elastic tape wrap. Such a tape wrap preferably has an adhesive backing for bonding to the envelope 8, and may be self amalgamating in order that subsequent layers bond to the underlying layers. Furthermore, the auxiliary member may be recoverable, in the form of a sleeve or tape. In general the auxiliary member will extend substantially the length of the envelope and be thinner and more flexible than the outer sleeve, in order that it be deformed by the outer sleeve to conform to the shape of the substrate or substrates.

Figure 3:
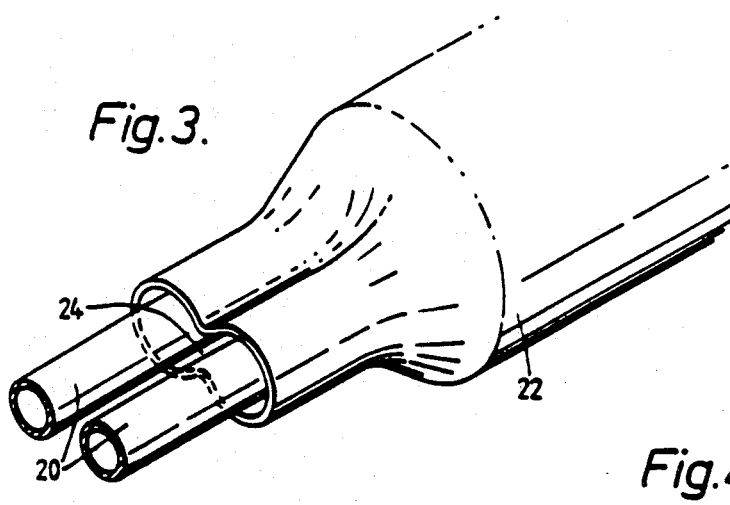
FIG. 3 is a perspective view showing a cable branch-off.
Figure 4:
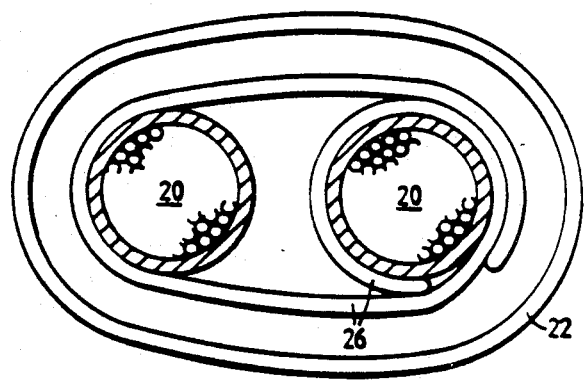
FIGS. 4 and 5 are end elevations showing alternative arrangements for sealing the branch-off of FIG. 3.
Figure 5:
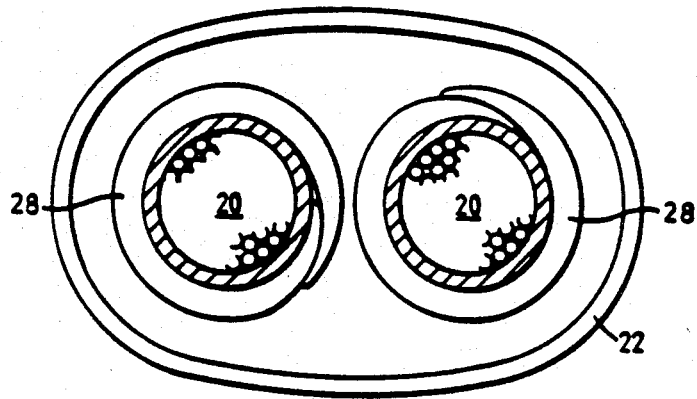

FIGS. 3 to 5 show a two-outlet cable branch-off and two arrangements for positioning the seals around the cables. It will be appreciated that similar arrangements could be designed for more outlets, however, if required, and the invention is particularly useful for branch-offs between 3, 4 or more cables since heat, which would be difficult to apply between many cables, need not be required, or if required is less likely to result in cable damage in spite of the long post-heating times required for such configurations.

In FIG. 3, two cables 20 are enclosed within a solvent or heat shrinkable sleeve 22 and a seal is needed between the cables 20 and the sleeve 22, and also in the void 24 between the cables 20.

In FIG. 4 an envelope 26 containing void-filling components that are curable when mixed together is wrapped around and between the cables 20. The envelope 26 is of a different shape and size from the envelope 8 described above with reference to FIGS. 1 and 2, since it has to be wrapped around and between the cables 20, but otherwise the construction of envelopes 8 and 26 are the same. FIG. 5 shows an alternative arrangement for sealing the two-outlet cable branch-off, and in this case a separate envelope 28 containing void-filling components is wrapped around respective cables 20. It has been found that to achieve an efficient seal a smaller total quantity of filling component is required in the envelopes if separate envelopes 28 are wrapped around respective cables, as in FIG. 5, than if one envelope 26 is used, as in FIG. 4.

A sealant mass (not shown) may be positioned on the cables as shown in FIGS. 1 and 2 or on the outer surface of the envelopes 26 and 28 to prevent leak paths along the outer surfaces of the envelopes.

Figure 6:
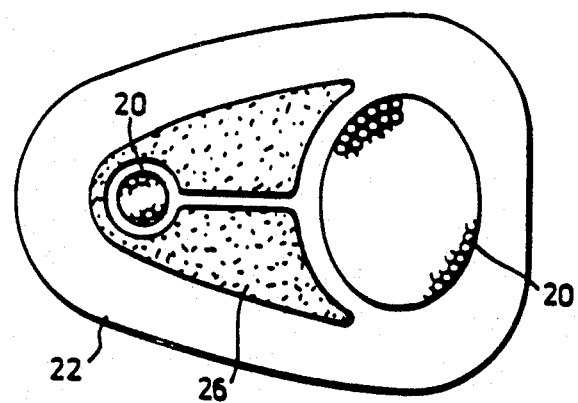
FIG. 6 is an end elevation showing a branch-off between cables of considerable difference in size.

In FIG. 6 a branch-off between two cables 20 of considerably different size is sealed by means of an envelope 26 containing a void-filling composition. The envelope has been wrapped only around the smaller of the two cables, and this can be seen to provide the desired filling of the concave crutch region. An outer recoverable sleeve 22 is used to complete the seal and cause the envelope to be deformed to conform to the gap between itself and the cables.

Figure 7:
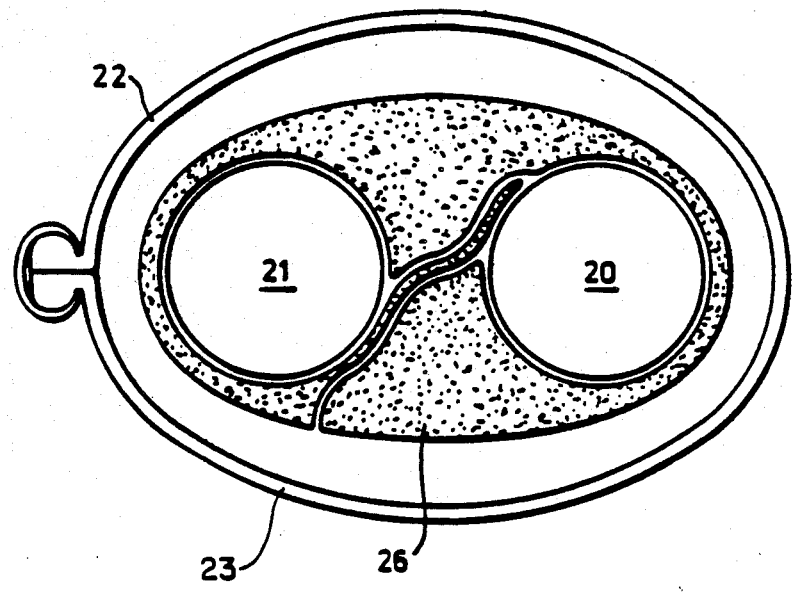
FIGS. 7 and 8 show the use of the invention with a recoverable outer sleeve and with rigid half-shells.
Figure 8:
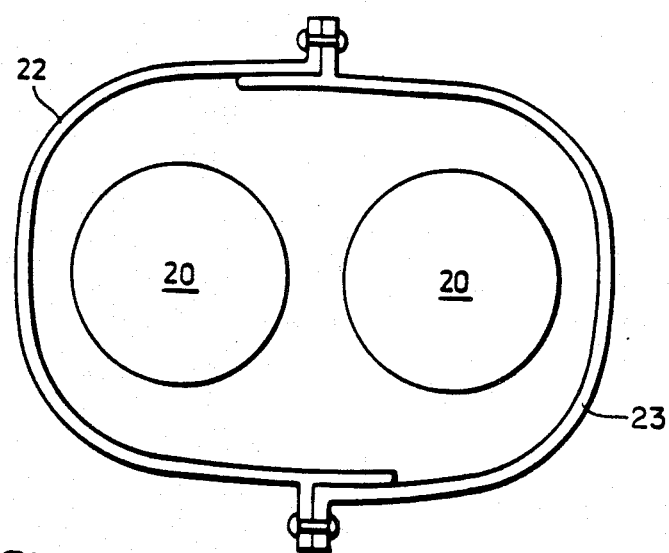

In FIGS. 7 and 8 a branch-off is again sealed by an envelope 26 (omitted from FIG. 8) and two outer surfaces 22 and 23 are compared. In each case the outer surface forms the encapsulation around the cables and provides the compressive force which is required to conform the envelope 26 to the surfaces which it has to seal. In FIG. 7 a wraparound recoverable sleeve is used, having rails at its opposing longitudinal edges which are held together by a C-shaped channel. In FIG. 8 two rigid half-shells having abutting flanges are held together by means of a nut and bolt. The nut and bolt may incorporate a compression spring so that some residual compressive force is maintained on the envelope.

Figure 9:
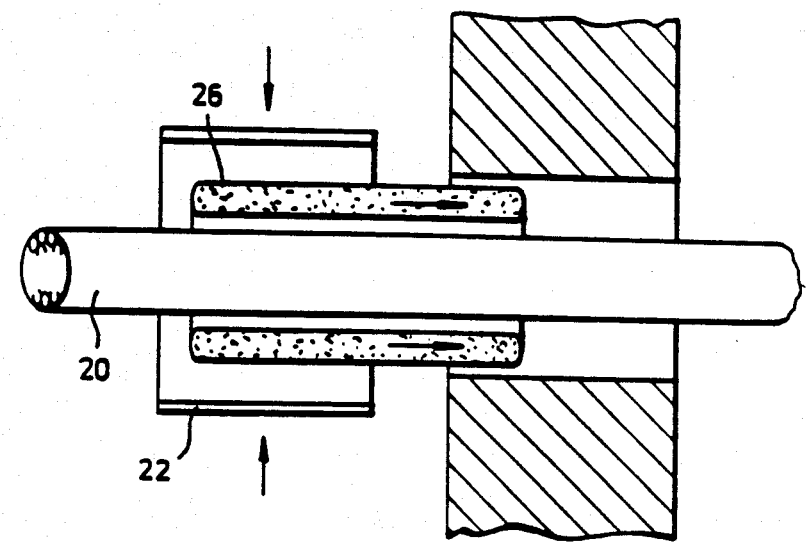
FIG. 9 shows a duct seal formed by the invention.

A duct seal is illustrated in FIG. 9. A cable 20 is shown passing through a hole in a wall, and an envelope of the present invention positioned ready for partial insertion in the annular space between the cable 20 and the wall. A shrinkable sleeve 22 is applied to a protruding portion of the envelope so that the void filling composition is displaced in the directions of the arrows to fill the annular gap. Once the envelope has taken up its final configuration, the void-filling composition is allowed to cure or otherwise to set. Instead of a shrinkable sleeve 22 one could use two half-shells or a hose clamp or other mechanical means of compressing the envelope. Such mechanical means may be used with other embodiments of the invention.

Figure 10:
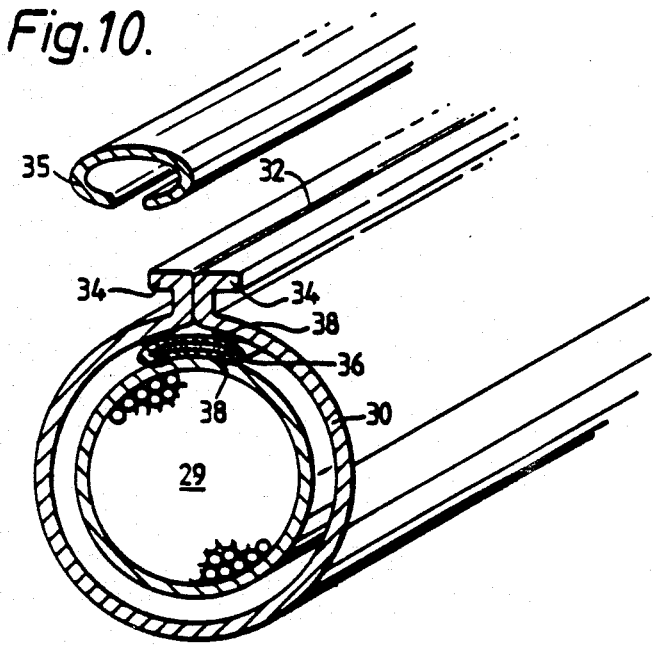
FIG. 10 is a perspective view, partly in section, showing sealing of a wraparound sleeve according to the present invention.
Figure 11:
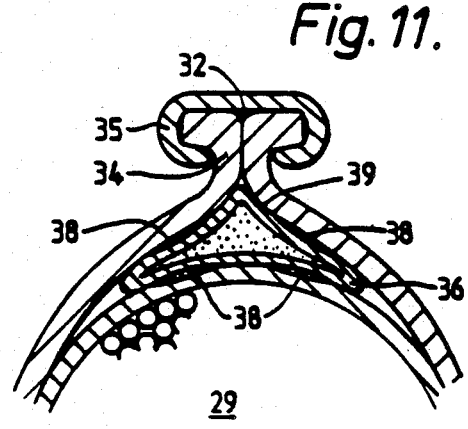
FIG. 11 is an enlarged view of the closure region of the wraparound sleeve of FIG. 10.

FIGS. 10 and 11 show an arrangement for forming a seal between a cable 29 enclosed by a wraparound heat-shrinkable sleeve 30. The wraparound sleeve 30 has longitudinally opposed edges 32 with upstanding flanges or rails 34 that are held in abutment by a channel 35 that slidably engages the rails 34. This form of wraparound device is described in U.K. Patent Specification No. 1,155,470 the disclosure of which is incorporated herein by reference. If a seal is required beneath the edges 32, an envelope 36 containing void-filling components that are curable when mixed together is positioned beneath the longitudinally opposed edges 32 of the wraparound sleeve 30. The envelope 36 is elongate so that it can be positioned beneath the edges, but otherwise is of the same construction as envelopes 8, 26 and 28 described above. The envelope 36 is also provided with a sealant mass 38, in the form of elongate strips, to prevent leakage along the outer surface of the envelope 36.

When the wraparound sleeve 30 is recovered, the shrinkage forces attempt to pull the rails 34 apart and a wedge shaped void 39 may occur between the rails 34. The flexibility of the envelope 36 allows the envelope to conform to fill any such void 39.

Figure 12:
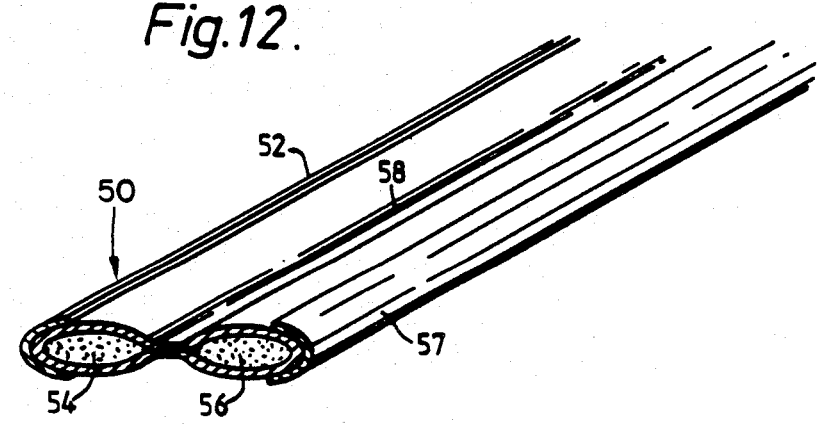

In FIG. 12 a seal 50 which may be used in the arrangement described above, comprises an envelope in the form of a hollow tape 52 that contains void-filling components 54 and 56 and is provided with two areas 57 of a sealant, e.g., a mastic.

The tape 52 is fusion bonded along a line 58 extending along the tape 52 or bonded by a suitable adhesive e.g. a pressure sensitive adhesive, so as to separate the components 54 and 56. The bond is so formed that it may be broken readily by pulling apart portions of the tape, by hand, and the components may then be mixed within the tape by working the tape between the hands. Alternatively, the tape 52 may be dimensionally recoverable, the forces of recovery overcoming the fusion bond. The tape 52 has a sealant mass 57 on its outer surface arranged so as to fill any space between the tape 52 and a dimensionally recoverable cover surrounding it.

Figure 13:
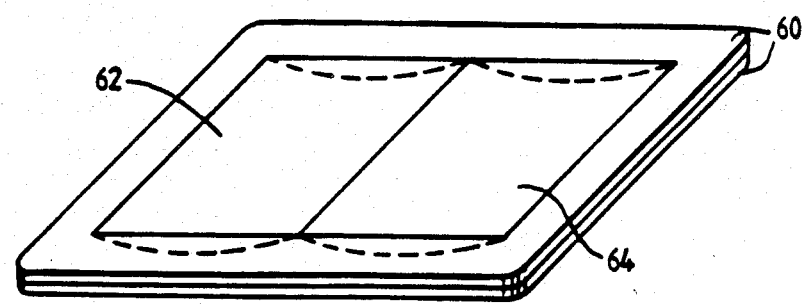

FIG. 13 shows a seal comprising an envelope having overlapping polymeric sheets 60 that are secured together around their edges to contain void-filling components 62 and 64. The sheets are fusion bonded together to separate the components 62,64. A sealant mass (not shown) is positioned on the outer surface of the sheets 60.

Figure 14:
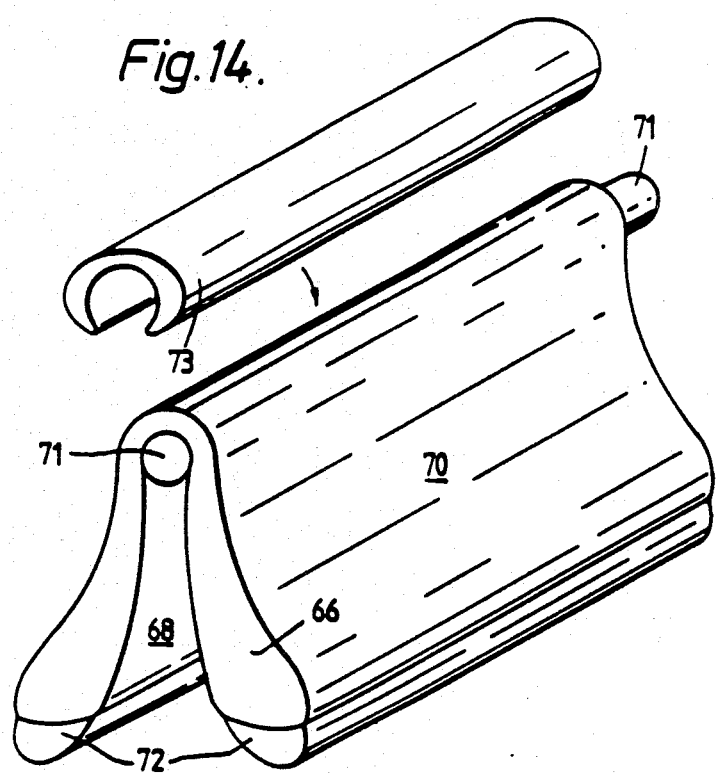
Figure 15:
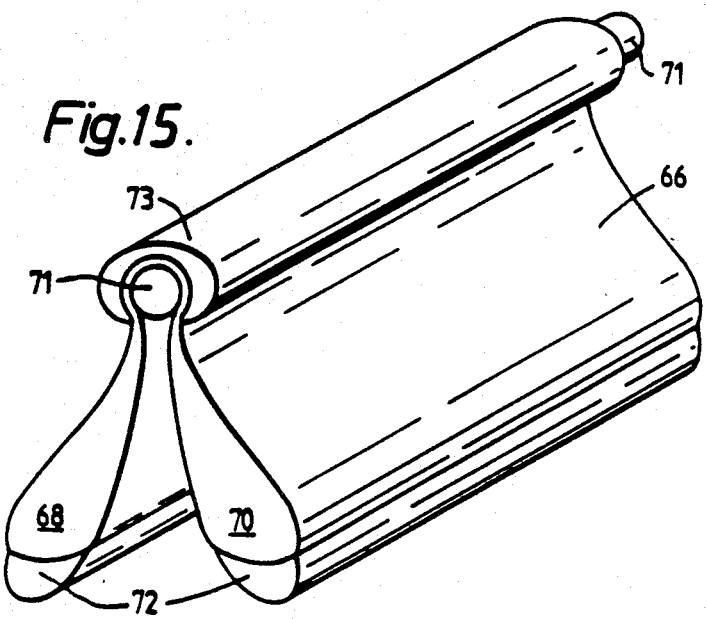

FIGS. 14 and 15 show a seal comprising an envelope in the form of a generally rectangular bag 66 containing void-filling components 68 and 70. Components 68 and 70 are separated by positioning the bag 66 between a rod 71 and a slidably engageable channel 73 such that portions of the bag 66 are squeezed together between the rod 71 and channel 73 to separate the components into two pockets on either side of the rod and channel. A sealant 72 is provided on the outer surface of the bag 66. The void filling components 68 and 70 in the bag 66 can readily be mixed together, immediately before use, simply by slidably disengaging the channel and rod 68, 70 and working the components together within the bag 66 by hand.

FIG. 16 shows a seal comprising an envelope formed from a single polymeric sheet 74 opposed edges 76 of which have been folded towards each and secured to the intermediate portion 78 by fusion bonding to form two bags 84 to separate void-filling components 80 and 82 contained therein. In use the portions 76 and 78 are pulled apart allowing the components 80 and 82 to escape from the bag 84 and mix. It will be appreciated that this arrangement may conveniently be used only in situations where the flow of the mixed components is constrained, for example, where the components flow into a void of pre-determined volume.

In this case, where the void-filling components contact the two surfaces to be sealed, it may be desirable for the components to be chosen so that the resulting cured mass will form an adhesive bond between the surfaces.

In FIG. 17 the two components of a two component reactive system are separated by being housed in separate containers. One component is housed in a small envelope within the larger envelope which constitutes the seal of the invention. On bursting the inner envelope the two components can mix and then cure. The inner envelope is conveniently substantially full and thus pressure can easily be applied to burst it. The outer envelope, however, although it contains only the two components, contains only a fraction of the total volume that it could contain. As a result, there is no danger of bursting the outer envelope by the force required to burst the inner envelope.

The material selected for the envelope depends on the intended use of the seal. The material is preferably sufficiently flexible to permit the envelope to be conformingly wrapped around an object to be enclosed but is prefereably also sufficiently strong to resist the forces that occur when the dimensionally-recoverable cover is recovered around it. The materials selected for the void-filling components are preferably deformable, at least before curing begins, so that they can conform to fill voids. As described above the components may cure when mixed together with or without the addition of heat.

Two examples of suitable void filling combinations are:

| | |
|---|---|
| Component A | 50 parts of an epoxy sold by Shell Chemicals under the trade name "Epon 828". |
| Component B | 50 parts of a reactive polyamide sold by General Mills under the trade name "Versamid 140". |
| Component A | 12 parts of an epoxy sold under the trade name Leaktherm X80 (Bayer AG) |
| Component B | 75 parts of an amine terminated butadiene nitrile rubber sold under the trade designation "1300X16" |

What is claimed is:

1. A method of forming a seal between at least one elongate object and a surface surrounding the or each object, which comprises:
   (a) positioning between the object and the surface a flexible envelope containing a void-filling composition which is capable of undergoing a change from a state of lower viscosity to a state of higher viscosity;
   (b) deforming at least part of the envelope thereby causing the void-filling composition to conform to the object and to the surface; and
   (c) causing said change from lower viscosity to higher viscosity.

2. A method according to claim 1, wherein a sealant is positioned adjacent the envelope to fill a space, if any, between the object and the surface.

3. A method according to claim 1, wherein the lower viscosity is less than $10^5$ cp at the temperature of installation.

4. A method according to claim 1, wherein the higher viscosity is at least $10^7$ cp at ambient temperature.

5. A method according to claim 1, wherein the lower viscosity is less than $10^5$ cp and the higher viscosity is at least $10^{10}$ cp, measured at the same temperature.

6. A method according to claim 1, wherein the void-filling composition is liquid before said change from lower viscosity to higher viscosity.

7. A method according to claim 1, wherein before step (a) is carried out the void-filling composition comprises two or more curable components.

8. A method according to claim 7, wherein portions of the envelope are engaged together thus separating the components, and the method includes the step of disengaging the engaged envelope portions to allow the components to mix.

9. A method according to claim 1, wherein the void-filling composition is a thermosetting material, and said change from lower viscosity to higher viscosity is brought about by heating.

10. A method according to claim 1, wherein the void-filling composition is a thermoplastic material which is allowed to cool to cause said change from lower viscosity to higher viscosity.

11. A method according to claim 1, wherein the envelope contains substantially only the void-filling composition.

12. A method according to claim 1, wherein the envelope consists substantially entirely of flexible sheet material.

13. A method according to claim 1, wherein the material of the envelope is stretched during step (b).

14. A method according to claim 13, wherein the material of the envelope is elastic.

15. A method according to claim 14, wherein the envelope has a value of E.t from 0.3–0.75 kg/cm, where E is the rubber modulus and t the relaxed thickness of the material of the envelope.

16. A method according to claim 1, in which the ratio between the volume of the envelope were it to adopt a substantially circular cross-section and the volume of its contents is from 3–9.

17. A method according to claim 1, wherein the surface is that of a dimensionally recoverable article.

18. A method according to claim 1, for sealing a branch-off between two or more elongate objects wherein the envelope extends between the elongate objects.

19. A method according to claim 1, wherein the surface is that of a wraparound article having longitudinally extending edge portions that are securable together.

20. A seal for preventing passage of fluid between substrates which comprises:
   a closed envelope of a flexible material; and
   a void-filling composition within the envelope which is capable whilst in the envelope of undergoing a change from a state of lower viscosity to a state of higher viscosity and of then remaining in said state of higher viscosity;
   said envelope being flexible over substantially its entire surface thus allowing the surface to conform to that of the substrates by bulk flow of said composition and then to retain that conformation on the change of viscosity of the composition; the ratio between the volume of the envelope if it were to adopt a substantially circular cross-section and the volume of its contents being from 2–9.

21. A seal according to claim 20, wherein the envelope contains substantially only the void filling composition.

22. A seal according to claim 20, which additionally comprises on an external surface of the envelope a sealant which is capable of filling a space between the envelope and a substrate.

23. A seal according to claim 20, wherein the void-filling composition comprises a thermosetting material.

24. A seal according to claim 20, wherein the void-filling composition comprises a thermoplastic material.

25. A seal according to claim 20, wherein the void-filling composition comprises components which are curable, and which are prevented from curing before use.

26. A seal according to claim 25, wherein the components are respectively housed before use in separate compartments of the envelope.

27. A seal according to claim 20, wherein the envelope comprises overlapping sheet portions containing the void filling compositions located between them.

28. A closure assembly for sealing a substrate which comprises a seal according to claim 20, and a closure means capable of deforming at least part of the envelope thereby causing the void-filling composition to conform to the surface of the substrate.

29. An assembly according to claim 28, wherein the closure means comprises a dimensionally recoverable sleeve.

30. An assembly according to claim 28, wherein the closure means operates mechanically.

31. A branch-off between at least two cables sealed by an assembly according to claim 28.

32. A supply line feed-through, in which the supply line is sealed to a bulkhead by an assembly according to claim 28.

33. A kit-of-parts which comprises:
(a) a flexible envelope containing a void filling composition which is capable of undergoing a change from a state of lower viscosity to a state of higher viscosity, and which is capable of being wrapped around an object; and
(b) a hollow recoverable article capable of surrounding said envelope and of recovering to cause the envelope to be deformed into conformity with said object, and with said article to form a seal between them.

34. A kit-of-parts according to claim 33, wherein the recoverable article is a wrap-around sleeve.

35. A kit-of-parts according to claim 33, wherein the filling composition is a thermoplastic material.

36. A kit-of-parts according to claim 33, wherein the filling composition comprises at least two or more curable components.

37. A kit-of-parts according to claim 33, wherein the envelope has on an external surface thereof a sealant.

* * * * *